June 6, 1944.  R. W. TOMLINSON ET AL  2,350,575
MANUFACTURE OF ALUMINUM SULPHATE PRODUCT
Filed March 11, 1941
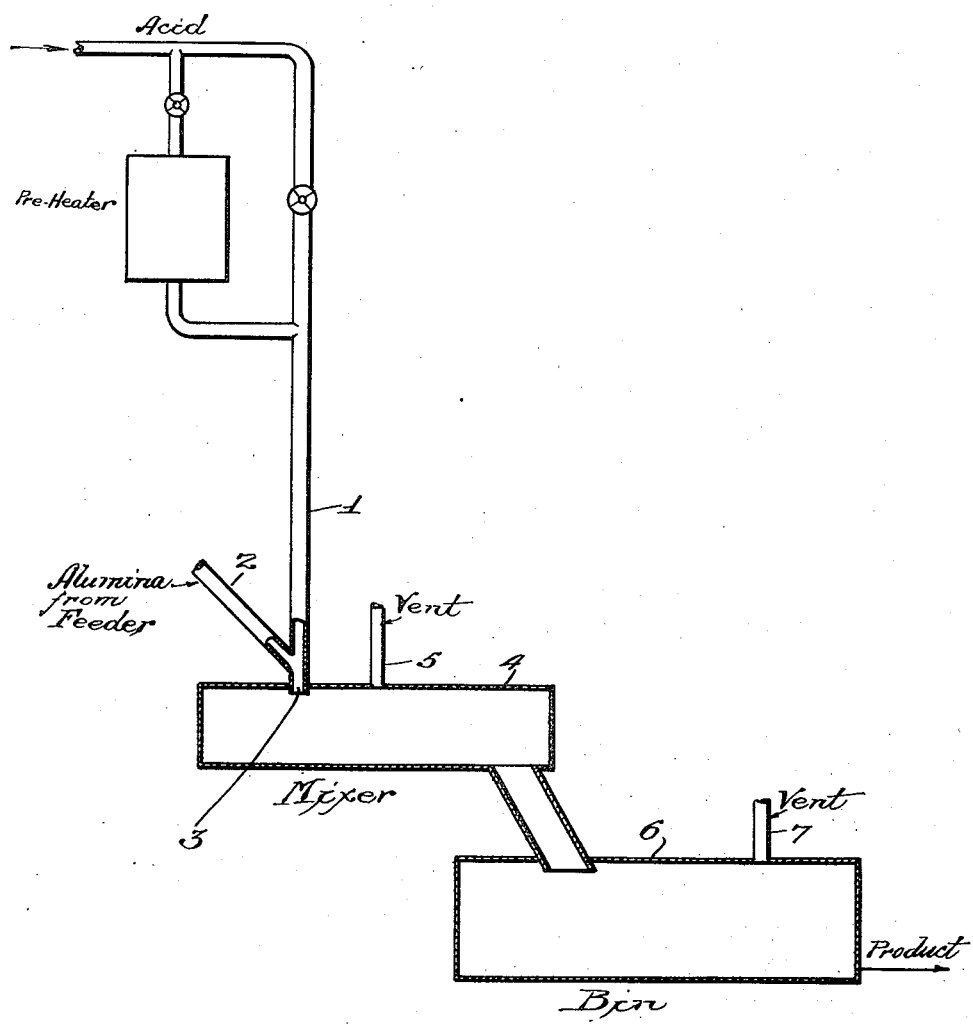

Patented June 6, 1944

2,350,575

UNITED STATES PATENT OFFICE 2,350,575

MANUFACTURE OF ALUMINUM SULPHATE PRODUCTS

Ritner W. Tomlinson, North Wales, and Henry G. Meyer, Philadelphia, Pa., assignors to The Pennsylvania Salt Manufacturing Company, Philadelphia, Pa., a corporation of Pennsylvania Application March 11, 1941, Serial No. 382,806

4 Claims. (Cl. 23—123)

The present invention relates to an improved process for the manufacture of aluminum sulphate, and more particularly it relates to a process by which aluminum sulphate in a form suitable for use in the industries may be produced in a continuous manner.

One object of the present invention is to provide a process for the manufacture of aluminum sulphate which will yield a material having a proper density, particle size, and other characteristics, making it suitable for use as a coagulant in the purification of water or as a sizing agent in the manufacture of paper and other materials.

A further object of the present invention is to furnish a process by which an aluminum sulphate product containing less water than that corresponding to the minimum melting point composition may be obtained in granular form directly from the reacting vessel.

Still another object is the provision of a continuous process for the manufacture of aluminum sulphate from sulphuric acid and an alumina-bearing material, such as bauxite, which process is characterized by simplicity and economy of operation.

Other objects will be apparent from a consideration of the specification and claims.

The accompanying drawing illustrates diagrammatically the manner in which the process may be conducted in accordance with the present invention.

Difficulties have heretofore been encountered in the manufacture of aluminum sulphate from sulphuric acid and alumina-bearing material, and various suggestions have been made to overcome these problems. It has been known from the melting point curve of commercial aluminum sulphate that the melting point of the product decreases as the alumina content increases from about 15% $Al_2O_3$ to 18%–19% $Al_2O_3$. Hence, when a product containing 15%–19% $Al_2O_3$ and at least 35% water is heated, it will melt, and attempts to dehydrate products containing water in excess of about 35% have encountered difficulty because of the formation in the kiln or dehydrator of a plastic mass from which it is practically impossible to remove the water.

In one prior process, where it was desired to obtain a product that is easily calcined, sulphuric acid of suitable concentration was mixed into a large batch of suitably ground bauxite. The mixture, preferably in the form of a fluid paste, was placed in a container and allowed to react therein, the heat of the reaction in the container being relied upon to drive off sufficient water to form a product having a lower water content than that of the minimum melting point composition. This product was a compact mass of a cake-like nature, very hard to crush and requiring strong calcination in the dehydration thereof. The product obtained by this process also contained residual acid due to the fact that the acid was added to all of the bauxite, as a result of which it was difficult to secure thorough mixing within the short time contemplated by the process. In fact in such a process, the more rapidly the acid is added to the bulk of bauxite, the greater will be the tendency of the resultant mixture to be improperly mixed. Another disadvantage, resulting from this type of mixing, is that much heat is lost during the acid addition while the greater part of the reaction takes place in the container, and not where the acid and bauxite are brought into contact with each other. Hence, no "hot zone" such as is created in the process of the present invention, as will hereinafter appear, was provided in the mixer in the practice taught by the prior art.

The present invention is a marked departure from the teachings of the prior art and contemplates a process for the manufacture of aluminum sulphate from sulphuric acid and alumina-bearing material, such as bauxite, in which each part of the alumina-bearing material is subjected to reaction with the amount of acid required for reaction for the same length of time as any other part, and in which the reaction is substantially completed in the reaction vessel, from which a granular material containing less water than that of the minimum melting point composition is discharged. The process, therefore, results in the production of a granular aluminum sulphate which will not coalesce or become sticky or semi-fluid during the subsequent step of the process or upon heating.

The process is carried out in a continuous manner by continuously bringing together in a mixer of the conveyor type a stream of alumina-bearing material and a stream of sulphuric acid, the amount of each corresponding substantially to that required for reaction to form aluminum sulphate. Intimate mixing is assured if the streams are intermingled prior to being fed to the reacting vessel. As previously stated, bauxite is the preferred alumina-containing material and the concentration of the sulphuric acid is preferably above about 65%, hereinafter termed "concentrated sulphuric acid"; for example, about 65% to about 95% $H_2SO_4$, preferably from about 65% to 85%. The acid may be preheated to any desired temperature, for example up to about 130° C. to hasten the reaction with the alumina-bearing material. If the acid is preheated, a preferable range is from about 100° C. to 130° C. With higher concentrations of acid, the use of lower preheating temperatures gives results equivalent to those obtained by the use of higher preheating temperatures with lower concentrations. The concentration of acid employed in any particular case will depend to some extent on the moisture content of the alumina-bearing material, the temperature attained in the mixer, and the temperature of the acid, and the various factors employed in the process will be selected so that a granular product, the reaction of which is at least 90% complete and which contains less than 35% water, will be discharged from the mixer. In carrying out the process, a slight excess of alumina-bearing material is usually employed, the use of which is included in the phrase "substantially reacting proportions."

The process is, therefore, conducted so that the heat liberated by the reaction will be sufficient to form in the mixer a product containing less than 35% water. At the portion of the mixer where the separate streams of reactants are brought together and mixed, there is created a so-called "hot zone" because of the vigorous reaction resulting from the thorough mixing of the acid and alumina-bearing material in substantially reacting proportions. As the process is a continuous one, the heat of the "hot zone," supplied by the heat liberated from the reaction of the acid and ground alumina-bearing material fed thereto, will cause a vigorous evolution of steam, and this combined with the stirring or agitation of the mixing conveyor which causes immediate intimate contact between the reactants results in the formation of a granular aluminum sulphate product containing less than 35% of water, this value being usually not more than 30%. In other words, by controlling the total throughput of materials in any given time, enough heat is accumulated in the "hot zone" to cause the desired reaction and water evaporation in a very short time. The stirring of the material in the mixer serves to convey the material in the mixer toward the discharge end thereof as well as to granulate the reaction product. The time spent, by any given part of the mass in the mixer will generally vary from 1 to 4 minutes, usually 1 or 2 minutes.

The granular product, as it is discharged from the mixer, is at least approximately 90% reacted, and the reaction may be completed by allowing the granular material to stand in a bin, for example for 10 to 60 minutes, depending upon the extent of reaction in the mixer and the temperature of the granular material discharged therefrom. Because the granular material is substantially completely reacted before it leaves the mixer, there is no substantial rise in temperature of the granular material in the bin and because of this and the fact that the product has a lower water content than that of the minimum melting point composition, there is no tendency for the granular material to coalesce in the bin and it, therefore, remains in its desirable granular form.

From the foregoing, it will be apparent that the process of the present invention results in the formation of an aluminum sulphate product which is of a uniform composition throughout due, at least in part, to the fact that each particle of alumina-bearing material is brought into intimate contact with its share of the acid, and that any given portion of the charge remains in the mixer for the same length of time as every other portion. Thus, the product will be substantially free from residual acid, and, therefore, may be shipped in paper bags which is not possible in the case of a material containing acid due to the ease with which such material is corroded by acid. By the present process, aluminum sulphate is obtained in the form of granular particles of such size and nature that it may be used, without further processing as a coagulant in filtering operations, as a sizing agent in the manufacture of paper, and in other processes. In addition, the product obtained has a lower water content than that of the minimum melting point composition and, therefore, has no tendency to become sticky or semi-plastic when heated, and may be dehydrated, if desired, without difficulty.

In the drawing, which illustrates schematically the manner in which the process may be carried out, the sulphuric acid of a suitable concentration, which as before stated may be preheated, is fed continuously in predetermined quantities, for example by a controlled quantity feeder, through pipe 1 to the junction of pipes 1 and 2 (the inlet to the mixer) marked 3. The alumina-bearing material, which in the examples given below is bauxite, ground sufficiently fine to insure a thorough contact with the acid, is fed continuously in predetermined quantities, for example by a continuous constant weight feeder, to inlet 3. The acid and bauxite are fed in the proportion required to form aluminum sulphate and the joining of the two streams insures intimate contact of the reactants. If desired, the two materials may be fed separately and brought into contact in the mixer. The mixture of acid and bauxite flows from inlet 3 to mixer 4 which is of the continuous conveyor type, and is preferably of the construction described in copending application Serial No. 349,366 filed August 1, 1940 (now Patent No. 2,283,008). The conveying means in the mixer serves to stir or agitate the mixture thoroughly as well as to convey it to the discharge end. The portion of the mixer 4 adjacent the inlet point of the mixed streams of bauxite and acid is the so-called "hot zone" previously described. This "hot zone" in the mixer may extend from the inlet 3 to the vent 5. The process provides wetting of the particles of alumina-bearing material by acid of sufficient concentration during the entire time of vigorous reaction, and the heat available evaporates water from the film of acid on the alumina-bearing particles as water of reaction is formed. With good wetting of the particles and with acid of proper concentration a high rate of reaction is obtained and a granular product of desired degree of reaction and water content is produced in a very short time, as herein pointed out. The reaction in the mixer is vigorous and water is evolved as steam which passes out of the mixer through vent 5. As previously stated, due to the "hot zone" in the mixer 4, the material discharged therefrom is in granular form and contains less than 35% water, usually less than 30% water. The time spent by any part of the mass in the mixer will generally vary from about 1 to 4 minutes, usually from about 1 to 2 minutes.

The granular material from the mixer 4 falls into bin 6 in a substantially reacted condition, at least approximately 90% reacted. The small amount of water liberated from the material in bin 6 caused by completion of the reaction therein is removed from the bin 6 through vent 7. The material does not lose its granular characteristics in bin 6 and the liberation of the small amount of water from the material in bin 6 is aided by the porous structure of the granular particles formed in the mixer. The reaction in the bin is completed either from 10 to 60 minutes, as hereinbefore stated. A plurality of bins in parallel may be used, if desired, so that the granular product from the mixer may be delivered to one of the bins while the granular product in one or more of the other bins is maturing. A system of conveyed bins may be employed. If automatic removal of the material from the bin upon completion of the reaction is advantageous, the bin may be provided with a belt conveyor upon which the granular material from the mixer may fall. The product may be sold to the trade as it comes from the bin, but if a finer particle size is desired, it may be comminuted without difficulty.

The following examples are illustrative of the process of the present invention, and in carrying out these examples the system shown in the flow sheet of the accompanying drawing was employed.

EXAMPLE I

Acid: 14.8 lbs./min. 84.04% $H_2SO_4$., 27° C.
Bauxite: 8 lbs./min 88%–97% through 100 mesh.

| Analysis | Mixer discharge | Product |
|---|---|---|
| | Per cent | Per cent |
| Total $Al_2O_3$ | 19.05 | 21.20 |
| Free $Al_2O_3$ | | 0.02 |
| Total $SO_3$ | 49.69 | 50.28 |
| Free $SO_3$ | 4.39 | |
| Total $Fe_2O_3$ | 0.32 | 0.32 |
| Insoluble | 8.39 | 5.32 |
| Water, by difference | 22.55 | 22.88 |

*Temperatures*

Mixer:
                               °C.
  Feed point _____ 154–166
  Discharge _____ 138
Bin _____ 127 (maximum)

EXAMPLE II

Acid: 21.5 lbs./min. 68.59% $H_2SO_4$., 127° C.
Bauxite: 9.5 lbs./min. 88%–97% through 100 mesh.

| Analysis | Mixer discharge | Product |
|---|---|---|
| | Per cent | Per cent |
| Total $Al_2O_3$ | 17.62 | 18.54 |
| Free $Al_2O_3$ | | 0.16 |
| Total $SO_3$ | 43.86 | 43.69 |
| Free $SO_3$ | 1.96 | |
| Total $Fe_2O_3$ | 0.32 | 0.32 |
| Insoluble | 7.43 | 6.24 |
| Water, by difference | 30.77 | 31.21 |

*Temperatures*

Mixer:
                               °C.
  Feed point _____ 134
  Discharge _____ 112
Bin _____ 110

EXAMPLE III

Acid: 27.9 lbs./min. 72.12% $H_2SO_4$., 117° C.
Bauxite: 13 lbs./min. 88%–97% through 100 mesh.

| Analysis | Product |
|---|---|
| | Per cent |
| Total $Al_2O_3$ | 19.27 |
| Free $Al_2O_3$ | 0.13 |
| Total $SO_3$ | 45.44 |
| Total $Fe_2O_3$ | 0.30 |
| Insoluble | 7.05 |
| Water, by difference | 27.94 |

A consideration of Examples I and II shows that the reaction was substantially completed in the mixer, since the first shows a 91.2% reaction while the second shows a 95.5% reaction.

Considerable modification is possible in the factors employed in the process, as well as in the steps thereof, without departing from the essential features of the invention.

We claim:

1. The steps in a continuous process for the manufacture of an aluminum sulphate product which comprise continuously feeding a stream of alumina-bearing material and a stream of concentrated sulphuric acid, in substantially reacting proportions to form an aluminum sulphate product under conditions such that water including water of reaction is provided appreciably in excess of 35% calculated on the basis of said product, to that portion of a reaction mixer where previously reacting streams of said reactants have created a hot zone, the concentration and temperature of the sulphuric acid fed to said zone being adjusted to permit the heat of reaction in the mixer to liberate and vaporize water and to form a discontinuous granular aluminum sulphate product containing less than about 35% water and to maintain said hot zone; mixing said streams in said zone to provide wetting of the particles of alumina-bearing material by the corresponding amount of sulphuric acid required for reaction therewith and to initiate reaction therebetween to form said aluminum sulphate product; continuously moving the particles of alumina-bearing material wetted by said sulphuric acid and reacting therewith from the hot zone toward the discharge end of the mixer; during said movement in the mixer permitting free escape of water vapor from the mixer; continuously agitating the material in the mixer during its said movement therethrough until said aluminum sulphate product in discontinuous granular form containing less than about 35% water and at least approximately 90% reacted is obtained; and continuously discharging said granular product from the mixer.

2. The process of claim 1 wherein the alumina-bearing material is bauxite.

3. The process of claim 1 wherein the alumina-bearing material is bauxite and the concentration of sulphuric acid is between about 65% and about 85%.

4. The process of claim 1 wherein the alumina-bearing material is bauxite, the concentration of sulphuric acid is between about 65% and about 85% and the temperature of the sulphuric acid added is between about 100° C. and about 130° C.

RITNER W. TOMLINSON.
                      HENRY G. MEYER.